Aug. 8, 1967
R. C. JENSEN ET AL
3,334,495
BREACH-LOCK COUPLING
Filed Dec. 3, 1965
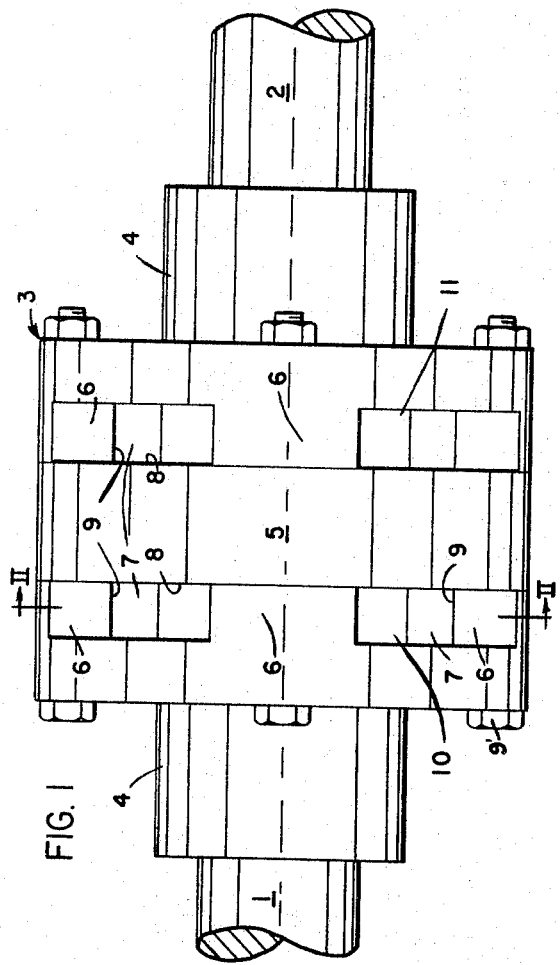
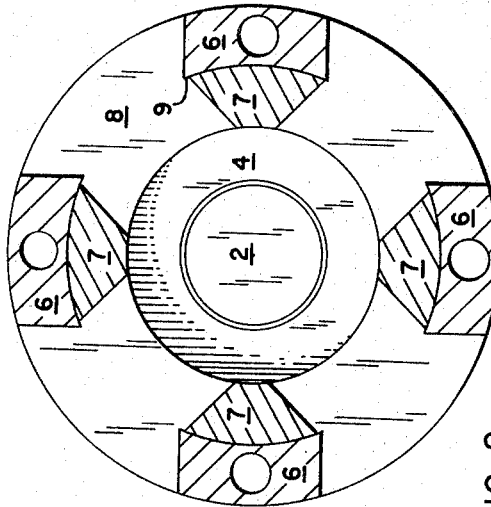
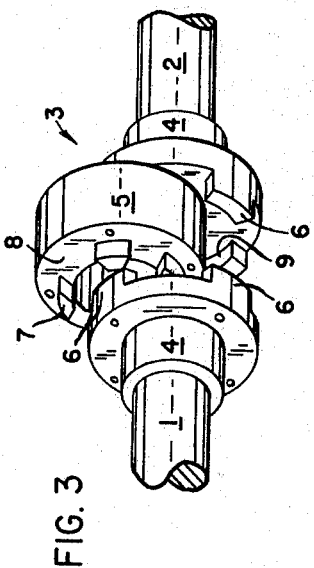
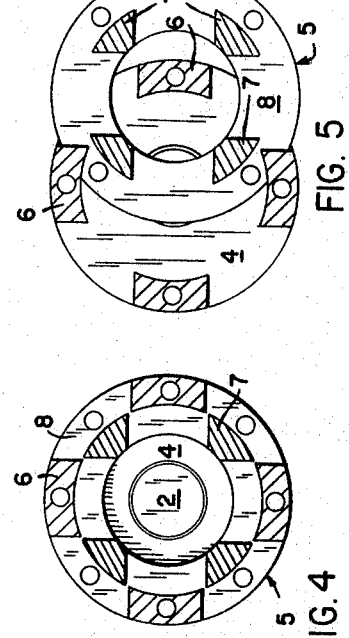
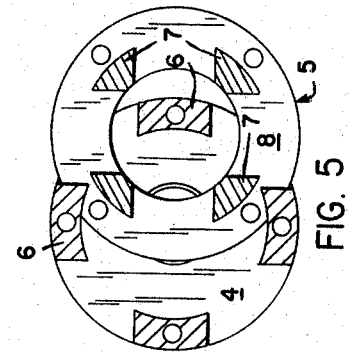
*INVENTOR.*
RICHARD C. JENSEN.
JOACHIM S. SOHRE.
BY
ATTORNEY.

3,334,495
BREACH-LOCK COUPLING
Richard C. Jensen, Greensburg, Pa., and Joachim S. Sohre, Vernon, Conn., assignors to Carrier Corporation, Syracuse, N.Y., a corporation of Delaware
Filed Dec. 3, 1965, Ser. No. 511,385
2 Claims. (Cl. 64—6)

This invention relates broadly to coupling devices. More particularly, this invention relates to a coupling device for connecting axially aligned rotary machine shafts, one of which is a drive shaft and the other a driven shaft. Still more particularly, this invention relates to a shaft coupling employing a breach-lock to accurately center the elements of the coupling.

In many applications where a driver shaft is coupled to a driven shaft, extreme accuracy is required in centering the elements of the coupling. This accuracy is usually obtained by providing rabbets on one element of the coupling for mating engagement with projections on the other element of the coupling. To assemble or disassemble such a coupling, however, one of the coupled shafts must be displaced axially to engage or disengage the mating elements.

It is therefore an object of this invention to provide an accurately centered shaft coupling.

It is a further object of this invention to provide a shaft coupling which requires negligible axial clearance for assembly or disassembly.

It is another object of this invention to provide a breach-lock centered coupling.

The objects of this invention are obtained by providing a hub for the driven shaft, a hub for the driving shaft and a coupling spacer for insertion between the two hubs. Spaced walls, projecting axially from each end of the coupling spacer and spaced walls projecting axially from each of the hubs form clearance spaces in the hubs and the coupling spacer to allow the coupling spacer to slide radially into axial alignment with the hubs. The walls on the coupling spacer have an outside diameter equal to the inside diameter of the walls on the hubs so that the coupling spacer can be rotated relative to said hubs to radially align the walls of the hubs with the walls of the coupling spacer. This provides accurate centering of the coupling elements.

Other objects and features of this invention will be apparent from a consideration of the ensuing specifications and drawings in which:

FIGURE 1 is an elevational view of the coupling forming the subject of this invention.

FIGURE 2 is a sectional view taken along lines II—II of FIGURE 1.

FIGURE 3 is a perspective view of the coupling showing the coupling spacer partially assembled with the other parts of the coupling.

FIGURE 4 is a sectional view similar to FIGURE 2 showing the coupling spacer rotated 45° relative to the hub portion in preparation for withdrawing the spacer from the coupling.

FIGURE 5 is a sectional view similar to FIGURE 2 showing the coupling spacer partially withdrawn from between the hub portions of the coupling.

Referring more particularly to the drawings, there is shown a shaft coupling 3 for transmitting rotary motion between a first shaft 1 and a second shaft 2. Hubs 4 are rigidly mounted on shafts 1 and 2, preferably by an interference fit. A coupling spacer 5 disposed between hubs 4 provides accurate axial alignment of hubs 4. Hubs 4 have a plurality of circumferentially spaced arcuate walls or projections 6 extending axially therefrom with the outer surface of the walls 6 being formed preferably on a radius, the center of which coincides with the center of the hub. Spacer 5 also has projecting from the end surfaces 8 thereof, a plurality of circumferentially spaced arcuate walls or projections 7, the outer vertical surface being formed on a radius substantially the same as the radius defined by the inner surface 9 of the hub projections 6. Each hub and each end of the coupling spacer has four equally spaced walls thereon, said walls effectively forming two clearance spaces 10 and 11 perpendicular to each other on each hub and on each end of the coupling spacer so that said coupling spacer walls or projections 7 will slide through the clearance spaces formed by the hub projections 6.

The coupling is assembled by sliding coupling spacer 5 radially between hubs 4 until the axis of spacer 5 is aligned with the axis of hubs 4. Spacer 5 is then rotated 45° relative to the hubs 4 so that projections 6 are radially aligned with projections 7. The hubs 4 are then bolted together through coupling spacer 5 by bolts 9' to provide a solid, accurately centered coupling.

It will be apparent from the foregoing description that projections 6 and 7 provide accurate centering of the coupling elements. It is also apparent that the coupling spacer can be inserted or removed without the necessity of axially displacing shafts 1 and 2.

While we have described a preferred embodiment of our invention, it will be understood that the invention may be otherwise embodied within the scope of the following claims.

We claim:
1. A coupling for drivably connecting a first and a second shaft comprising,
   a first-shaft engaging hub,
   a second-shaft engaging hub, said hubs each having spaced walls projecting axially therefrom,
   a coupling spaced, said spacer having spaced walls projecting axially therefrom at each end thereof, said coupling spacer walls having an outside diameter equal to the inside diameter of said hub-ring portions,
   means for connecting said hubs to said coupling spacer after said spacer is inserted between said hubs and displaced through an angle of 45° relative to said hubs.
2. A shaft coupling according to claim 1 in which each of said hubs and each end of said coupling spacer has four equally spaced walls thereon.

References Cited
UNITED STATES PATENTS

| 1,163,967 | 12/1915 | Arntzen et al. | 64—31 |
| 1,711,187 | 4/1929 | Triulzi | 64—14 |
| 2,084,862 | 6/1937 | Moser | 287—129 |
| 2,146,836 | 2/1939 | Merwin | 287—129 |

FRED C. MATTERN, JR., *Primary Examiner.*
H. C. COE, *Assistant Examiner.*